(12) United States Patent
Chiganmi et al.

(10) Patent No.: US 11,757,702 B2
(45) Date of Patent: Sep. 12, 2023

(54) AUTOMATED AND SCALABLE MULTI-LEVEL REDUNDANCY FOR CLOUD INFRASTRUCTURE

(71) Applicant: Cisco Technology, Inc., San Jose, CA (US)

(72) Inventors: Avinash Ashok Kumar Chiganmi, Fremont, CA (US); Venkatraman Venkatapathy, Fremont, CA (US); Giorgio Valentini, Walnut Creek, CA (US); Madhuri Kolli, San Jose, CA (US); Karumbayiram Gunasekaran, Fremont, CA (US); Balaji Sundararajan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/389,122

(22) Filed: Jul. 29, 2021

(65) Prior Publication Data
US 2022/0329477 A1   Oct. 13, 2022

Related U.S. Application Data

(60) Provisional application No. 63/172,463, filed on Apr. 8, 2021.

(51) Int. Cl.
| | | |
|---|---|---|
| H04L 41/0654 | (2022.01) | |
| H04L 12/46 | (2006.01) | |
| H04L 45/00 | (2022.01) | |

(52) U.S. Cl.
CPC ...... *H04L 41/0654* (2013.01); *H04L 12/4633* (2013.01); *H04L 45/22* (2013.01)

(58) Field of Classification Search
CPC .. H04L 41/0654; H04L 12/4633; H04L 45/22
See application file for complete search history.

(56) References Cited

U.S. PATENT DOCUMENTS

| | | | | |
|---|---|---|---|---|
| 9,800,474 B1 * | 10/2017 | Bush | ............ | H04L 63/20 |
| 10,887,276 B1 * | 1/2021 | Parulkar | ............ | H04L 61/4511 |

(Continued)

OTHER PUBLICATIONS

International Search Report and the Written Opinion for PCT Application No. PCT/US2022/023867 dated Jul. 22, 2022, 13 pages.

(Continued)

*Primary Examiner* — Chris Parry
*Assistant Examiner* — Dixon F Dabipi
(74) *Attorney, Agent, or Firm* — Polsinelli

(57) ABSTRACT

The present technology discloses methods, systems, and non-transitory computer-readable storage media for establishing a redundant path connection. An example method can include configuring a software-defined wide-area network (SDWAN) tunnel between an on-premises router and a plurality of SDWAN routers; configuring a virtual layer 2 connection between the plurality of SDWAN routers and handoff locations for a virtual cloud resource (VCR) associated with at least one VCR tag, wherein a software-defined cloud infrastructure (SDCI) underlay associated with at least one SDCI provider connects to a cloud service provider (CSP) at the handoff locations; configuring a VCR connection between at least one VCR associated with the VCR tag and the handoff locations for the at least one VCR; configuring a border gateway protocol (BGP) session between the plurality of SDWAN routers and the handoff locations; and validating the SDWAN tunnel, the virtual layer 2 connection, the VCR connection, and the BGP session.

20 Claims, 13 Drawing Sheets

(56) References Cited

U.S. PATENT DOCUMENTS

| | | | |
|---|---|---|---|
| 2002/0067725 A1* | 6/2002 | Oguchi | H04L 45/50 370/432 |
| 2012/0008528 A1* | 1/2012 | Dunbar | H04L 61/2592 370/255 |
| 2013/0111471 A1* | 5/2013 | Chandrasekaran | G06F 9/5077 718/1 |
| 2013/0304694 A1 | 11/2013 | Barreto et al. | |
| 2021/0058284 A1 | 2/2021 | Chandramohan et al. | |
| 2021/0089402 A1* | 3/2021 | Kottapalli | G06F 11/1435 |
| 2021/0160179 A1 | 5/2021 | Sundararajan et al. | |

OTHER PUBLICATIONS

Barozet et al.; "Cisco SDWAN/NFV Technical Marketing Deep Dive"; Dec. 1, 2017; retrieved from the internet: https://www.coursehero.com/file/71671376/Cisco-SDWAN-Deep-Divepdf/ [retrieved on Jun. 6, 2022]; 185 pages [NPL1-3; 2-3;3-3].

* cited by examiner

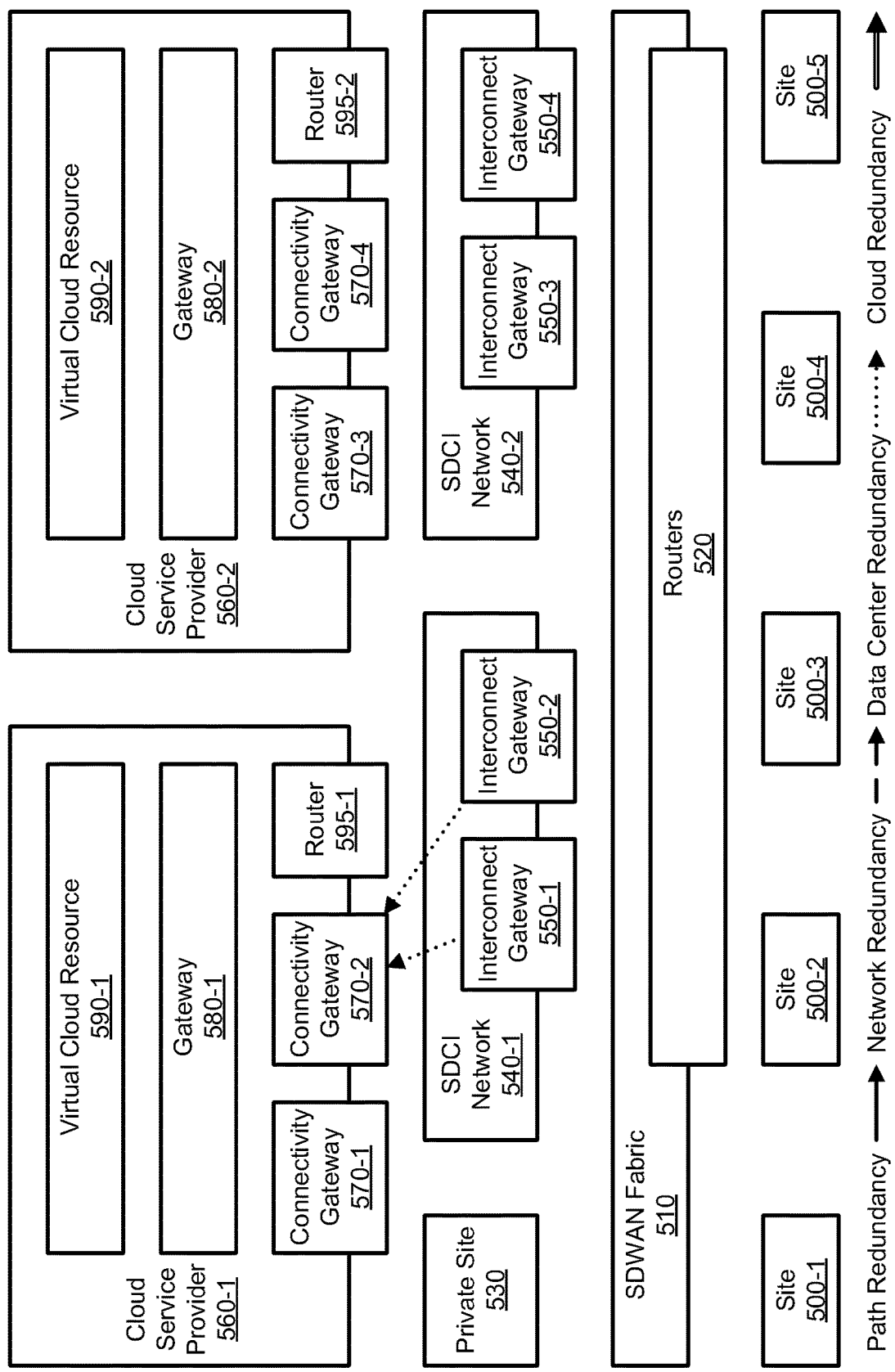

Graphical User Interface
600

2 interconnect gateways / 8 connections

[Search Bar 🔍]

| Interconnect Provider | Region | Connections | Resource State | Account ID | Gateway ID |
|---|---|---|---|---|---|
| Provider X | California | 4 up / 0 down | Active | 1234 | 5678 |
| Provider X | Washington | 5 up / 0 down | Active | 1357 | 9999 |

FIG. 6A

Graphical User Interface
610

Select gateway to set up connectivity on

[ CISCO_MP_DEV ▶ ]

[ ICGW-V2 ▶ ]

Name: ICGW-V2

Status: Active

Location: Los Angeles, CA, USA

[ Add Connection + ]

[ Search Bar 🔍 ]

| Interconnect Provider | Region | Connections | Resource State | Account ID | Gateway ID |
|---|---|---|---|---|---|
| Provider X | California | 4 up / 0 down | Active | 1234 | 5678 |
| Provider X | Washington | 5 up / 0 down | Active | 1357 | 9999 |

Configuring a software-defined wide-area network (SDWAN) tunnel between an on-premises router and a plurality of SDWAN routers
710

Configuring a virtual layer 2 connection between the plurality of SDWAN routers and handoff locations for at least one virtual cloud resource (VCR) associated with at least one VCR tag, wherein a software-defined cloud infrastructure (SDCI) underlay associated with at least one SDCI provider connects to a cloud service provider (CSP) at the handoff locations
720

Configuring a VCR connection between at least one VCR associated with the at least one VCR tag and the handoff locations for the at least one VCR
730

Configuring a border gateway protocol (BGP) session between the plurality of SDWAN routers and the at least one handoff locations
740

Validating the SDWAN tunnel, the virtual layer 2 connection, the VCR connection, and the BGP session
750

FIG. 7

AUTOMATED AND SCALABLE MULTI-LEVEL REDUNDANCY FOR CLOUD INFRASTRUCTURE

CROSS-REFERENCE TO RELATED APPLICATIONS

This application claims priority to U.S. Patent Application No. 63/172,463, filed on Apr. 8, 2021, entitled "Scalable Multi-Level Redundancy To Access Cloud Resources," the content of which is incorporated herein by reference in its entirety.

DESCRIPTION OF THE RELATED TECHNOLOGY

The present technology relates in general to the field of computer networking, and more particularly, to methods, systems, and non-transitory computer-readable storage media for automating and scaling multi-level redundancy for cloud infrastructure.

BACKGROUND

As cloud resource infrastructure becomes more complex and necessary for enterprise functions, networking solutions offering easy management of cloud infrastructure connections are in higher demand. Currently, however, there are no known on-premises controllers which offer automated or seamless management for cloud infrastructure.

BRIEF DESCRIPTION OF THE DRAWINGS

In order to describe the manner in which the various advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIGS. 5A-5D illustrate example systems for automating and scaling multi-level redundancy for cloud infrastructure, in accordance with some examples of the disclosure;

FIGS. 6A-6C illustrate example graphical user interfaces for automating and scaling multi-level redundancy for cloud infrastructure, in accordance with some examples of the disclosure;

FIG. 7 is a flowchart of a method for automating and scaling multi-level redundancy for cloud infrastructure according to an example of the instant disclosure.

DETAILED DESCRIPTION

Figure 1:
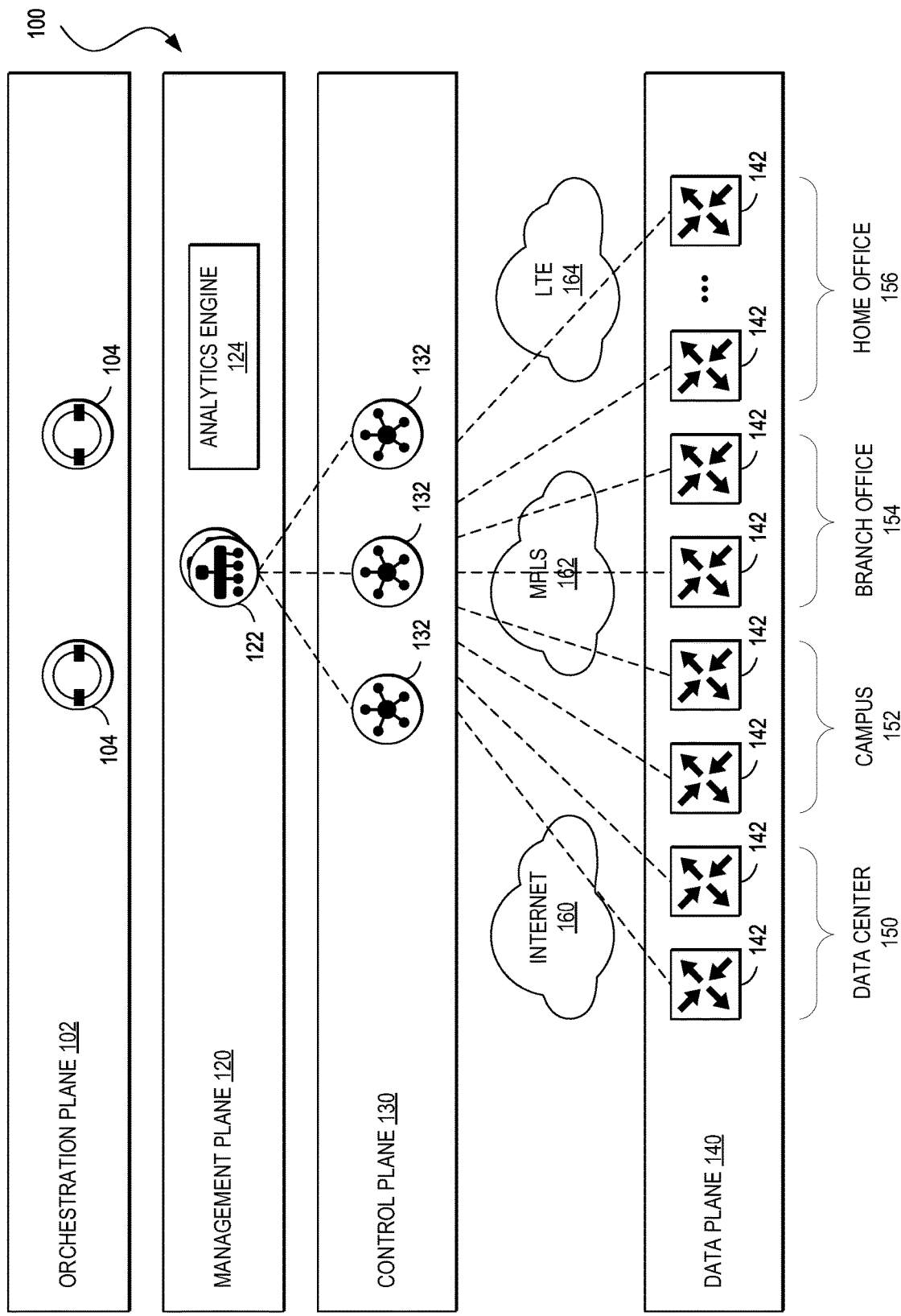
FIG. 1 illustrates an example of a high-level network architecture in accordance with some examples of the disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Systems, methods, and computer-readable media are provided for establishing a redundant path connection. An example method can include configuring a software-defined wide-area network (SDWAN) tunnel between an on-premises router and a plurality of SDWAN routers. The method can also include configuring a virtual layer 2 connection between the plurality of SDWAN routers and handoff locations for at least one virtual cloud resource (VCR) associated with at least one VCR tag wherein a software-defined cloud infrastructure (SDCI) underlay associated with at least one SDCI provider connects to a cloud service provider (CSP) at the handoff locations. The method can also include configuring a VCR connection between at least one VCR associated with the at least one VCR tag and the handoff locations for the at least one VCR. The method can also include configuring a border gateway protocol (BGP) session between the plurality of SDWAN routers and the handoff locations. The method can also include validating the SDWAN tunnel, the virtual layer 2 connection, the VCR connection, and the BGP session.

In some examples of the method, configuring the SDWAN tunnel between the on-premises router and the plurality of SDWAN routers can include instantiating the plurality of SDWAN routers across a plurality of physical locations wherein the plurality of physical locations can be provided by the at least one SDCI providers.

In some examples of the method, configuring the virtual layer 2 connection between the plurality of SDWAN routers and the handoff locations can include providing, to the plurality of SDWAN routers and the at least one SDCI providers, the handoff locations for at least one VCR tag.

In some examples, the method also includes generating virtual interfaces in CSP accounts associated with a user and associating the virtual interfaces with the handoff locations.

In some examples, the method also includes receiving a scaling request, the scaling request including at least one of an SDCI account, an SDWAN router from the plurality of SDWAN routers, primary and secondary handoff locations, workload tags, and a virtual private network (VPN) segment. The method can also include validating the scaling request. The method can also include provisioning layer 2 virtual cross connects (VXCs) from the SDWAN router to the primary and secondary handoff locations, route propagation for workloads associated with the workload tags, BGP peering, and a site preference. The method can also include configuring the SDWAN router, and validating at least one of network, data center, and cloud redundancy.

In some examples, the method also includes selecting an SDCI account, an SDWAN router from the plurality of SDWAN routers, and a set of connections for scaling. The method can also include retrieving information about the set of connections for scaling. The method can also include provisioning layer 2 virtual cross connects (VXCs) from the SDWAN router to a handoff location, route propagation for workloads, BGP peering, and a site preference. The method can also include configuring the SDWAN router. The method can also include validating the redundancy.

In some examples, the method also includes detecting a connection failure in one of the SDWAN tunnel, the virtual layer 2 connection, the VCR connection, or the BGP session. The method can also include attempting to reconcile the connection failure. The method can also include notifying a user device of the connection failure. The method can also include reconfiguring a connection associated with the connection failure in response to a request from the user device.

An example system can include one or more processors and at least one computer-readable storage medium storing instructions which, when executed by the one or more processors, cause the one or more processors to configure a software-defined wide-area network (SDWAN) tunnel between an on-premises router and a plurality of SDWAN routers. The instructions can also cause the one or more processors to configure a virtual layer 2 connection between the plurality of SDWAN routers and handoff locations for at least one virtual cloud resource (VCR) associated with at least one VCR tag wherein a software-defined cloud infrastructure (SDCI) underlay associated with at least one SDCI provider connects to a cloud service provider (CSP) at the handoff locations. The instructions can also cause the one or more processors to configure a VCR connection between at least one VCR associated with the at least one VCR tag and the handoff locations for the at least one VCR. The instructions can also cause the one or more processors to configure a border gateway protocol (BGP) session between the plurality of SDWAN routers and the handoff locations. The instructions can also cause the one or more processors to validate the SDWAN tunnel, the virtual layer 2 connection, the VCR connection, and the BGP session.

An example non-transitory computer-readable storage medium having stored therein instructions which, when executed by a processor, cause the processor to configure a software-defined wide-area network (SDWAN) tunnel between an on-premises router and a plurality of SDWAN routers. The instructions can also cause the one or more processors to configure a virtual layer 2 connection between the plurality of SDWAN routers and handoff locations for at least one virtual cloud resource (VCR) associated with at least one VCR tag wherein a software-defined cloud infrastructure (SDCI) underlay associated with at least one SDCI provider connects to a cloud service provider (CSP) at the handoff locations. The instructions can also cause the one or more processors to configure a VCR connection between at least one VCR associated with the at least one VCR tag and the handoff locations for the at least one VCR. The instructions can also cause the one or more processors to configure a border gateway protocol (BGP) session between the plurality of SDWAN routers and the handoff locations. The instructions can also cause the one or more processors to validate the SDWAN tunnel, the virtual layer 2 connection, the VCR connection, and the BGP session.

DESCRIPTION OF EXAMPLE EMBODIMENTS

This disclosure will first discuss examples of network architectures and topologies for software-defined wide-area networks (SD-WANs), as well as various overlays for such networks. Then, the disclosure will discuss example embodiments for automating and scaling multi-level redundancy for cloud infrastructure. Finally, the disclosure will discuss an example computing system which can be used to execute aspects of the present technology.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122. The management plane 120 can include an analytics engine 124 to provide analytics for the network.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN networking (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
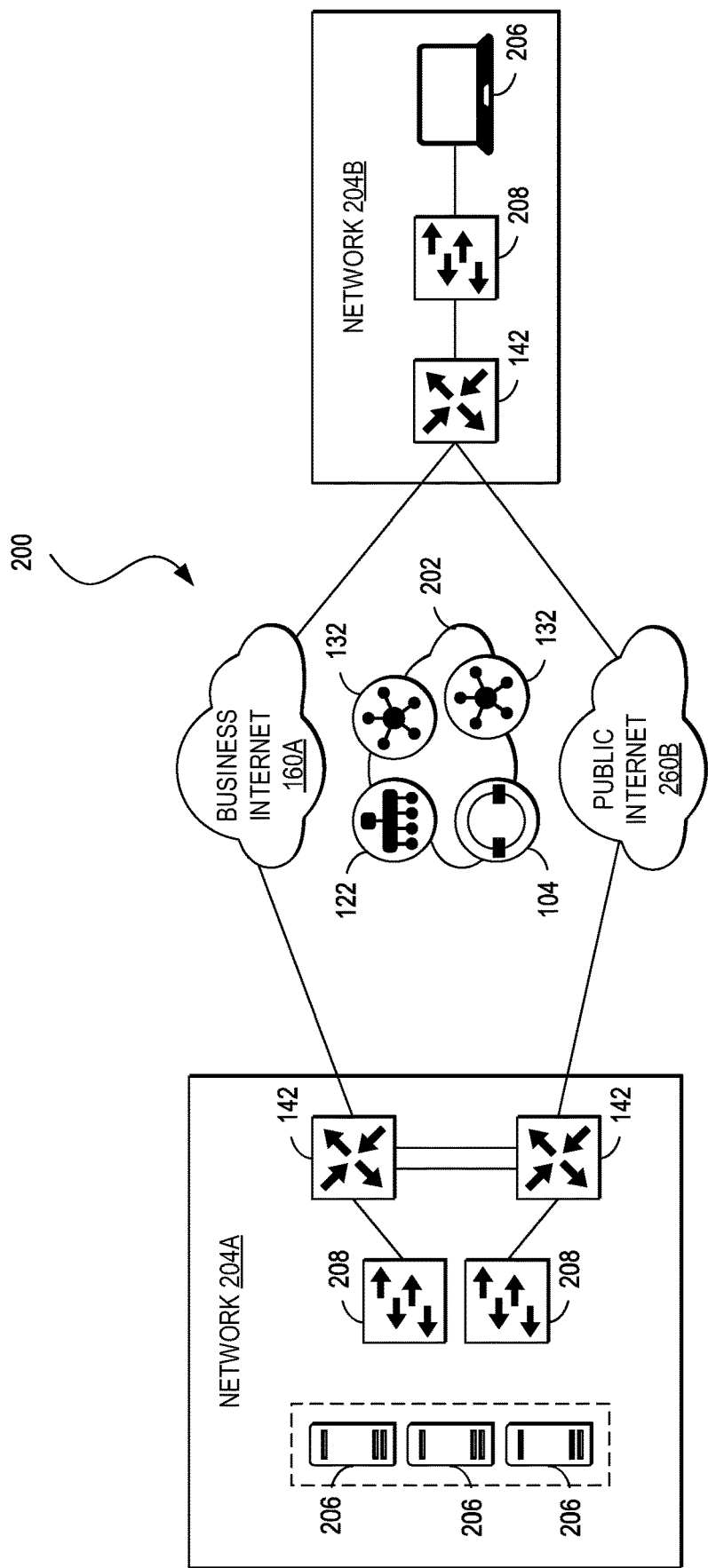
FIG. 2 illustrates an example of a network topology in accordance with some examples of the disclosure.

FIG. 2 illustrates an example of a network topology 200 for showing various aspects of the network architecture 100. The network topology 200 can include a management network 202, network sites 204A and 204B (collectively "network sites 204" hereinafter) (e.g., the data center(s) 150, the campus network(s) 152, the branch office network(s) 154, the home office network(s) 156, cloud service provider network(s), etc.), and Internet transport networks 160A and 160B (collectively "Internet transport networks 160" hereinafter). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMOs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
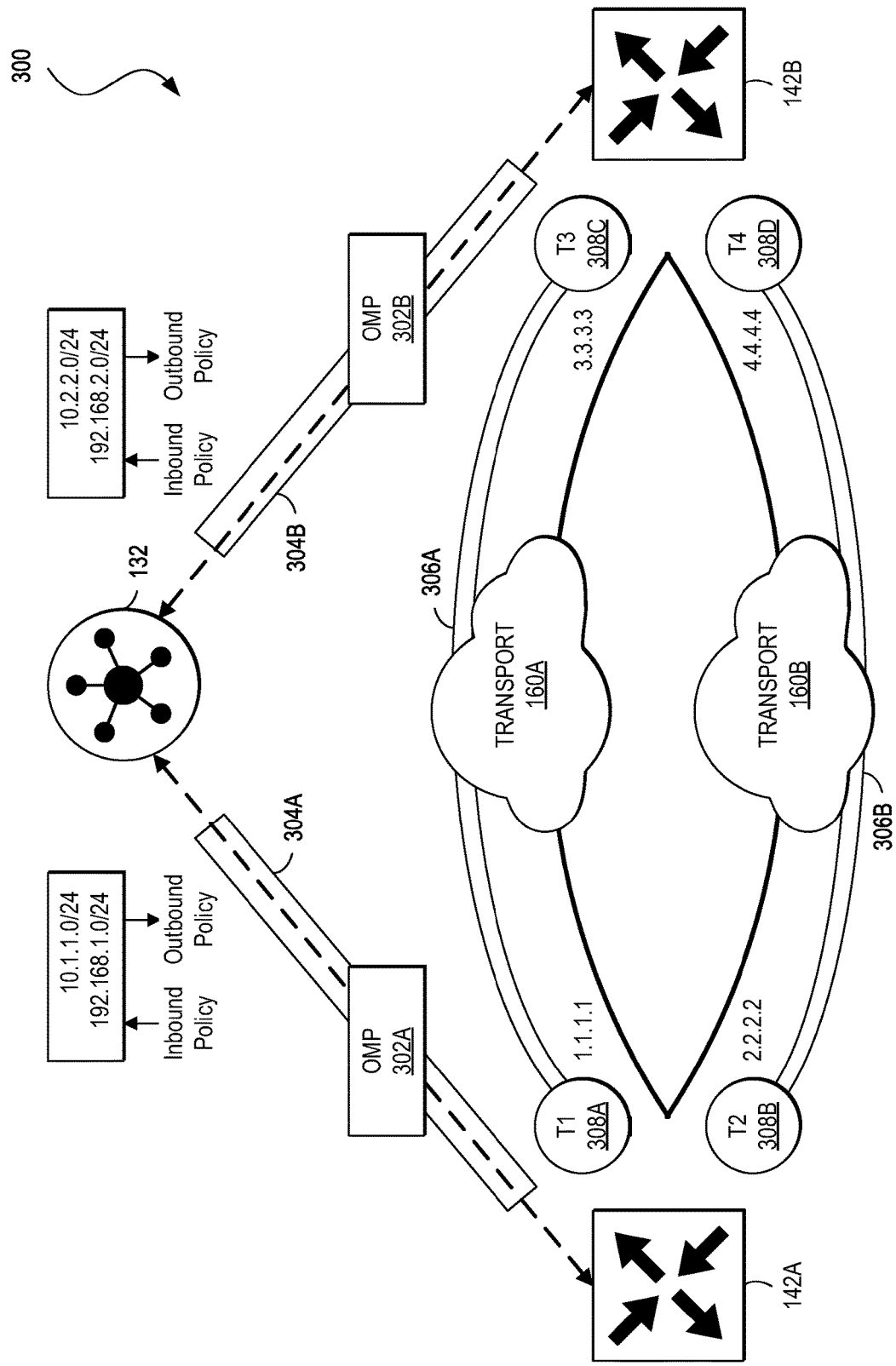
FIG. 3 illustrates an example of a diagram showing the operation of a protocol for managing an overlay network in accordance with some examples of the disclosure.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise various types of routes. For example, OMP can advertise OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

In another example, OMP can advertise TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

In another example, OMP can advertise service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
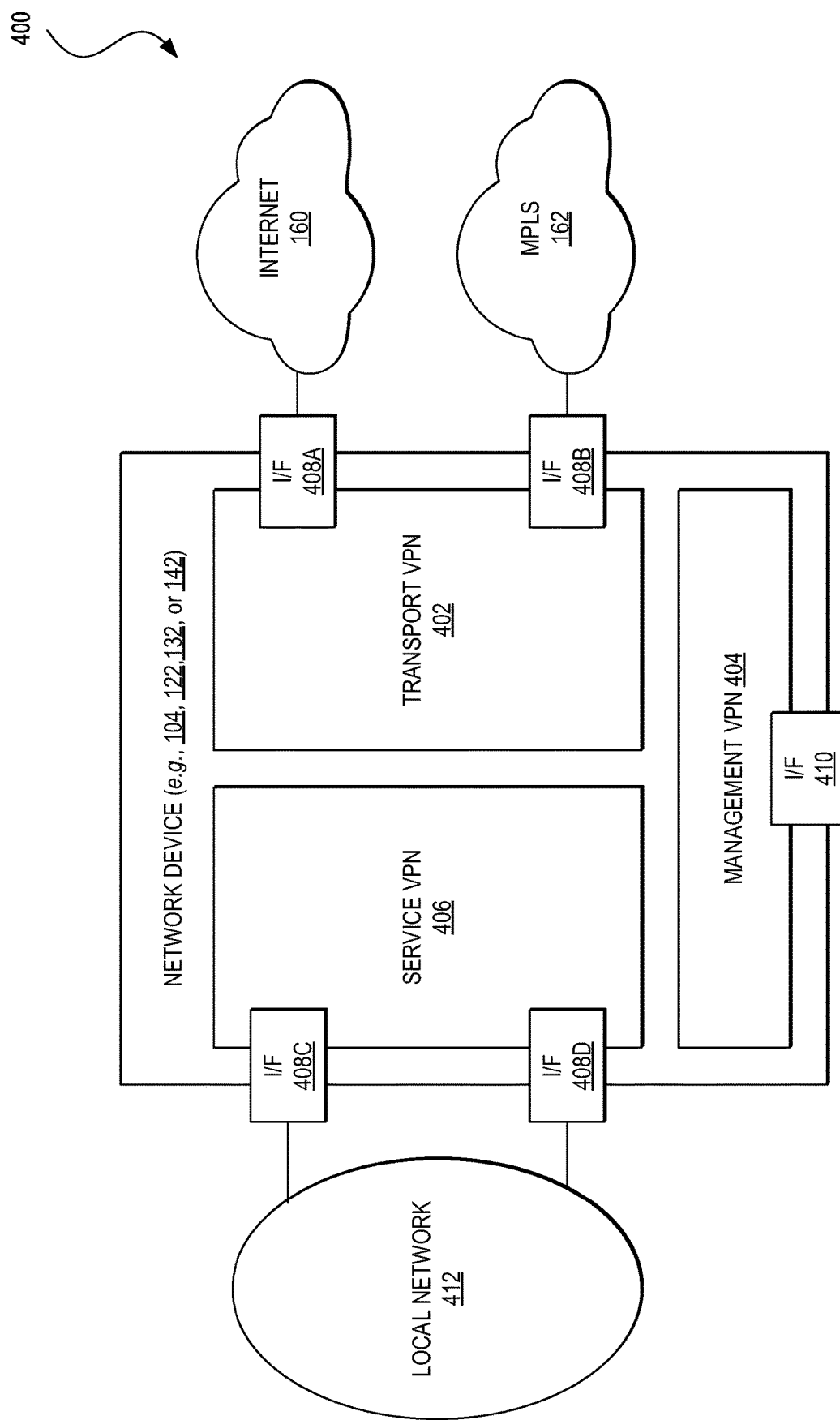
FIG. 4 illustrates an example of a diagram showing the operation of virtual private networks for segmenting a network in accordance with some examples of the disclosure.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively "network interfaces 410" hereinafter) are shown to be physical interfaces in this example, one of ordinary skill in the art will appreciate that the interfaces 410 in the transport and service VPNs can also be sub-interfaces instead.

The disclosure now turns to a discussion of examples for automating and scaling multi-level redundancy for cloud infrastructure.

There is a need in the art for cloud infrastructure which enables network administrators to dynamically bring up or tear down fully automated and scalable redundant connections from a site, such as an on-premises branch, to a cloud service provider (CSP). As explained herein, in some examples, an orchestrator with underlay provisioning can provide such a service, connecting sites, such as on-premises branches, to one or more software-defined cloud interconnect (SDCI) platforms and CSPs. As business demand increases, connectivity and continuity that is persistent and scales is increasingly beneficial for modern operations.

FIGS. 5A-5D illustrate an example system for automating and scaling multi-level redundancy for cloud infrastructure. Various example redundancies are illustrated in each of the figures.

Sites 500-1, 500-2, 500-3, 500-4, 500-5 (collectively "sites 500" hereinafter) can be various on-premises branch sites for an entity such as an enterprise, and can be similar to campus 152, branch office 154, or home office 156 as illustrated in FIG. 1. Sites 500 can be connected to SDWAN fabric 510, which can contain routers 520. SDWAN fabric 510 can be similar to networks 204A and 204B as illustrated in FIG. 2.

Routers 520 can connect sites 500 to private site 530 and/or SDCI networks 540-1 and/or 540-2 (collectively "SDCI networks 540" hereinafter) via interconnect gateways 550-1, 550-2, 550-3, 550-4 (collectively "interconnect gateways 550" hereinafter). Interconnect gateways 550 and connectivity gateways 570-1, 570-2, 570-3, 570-4 (collectively "connectivity gateways 570" hereinafter) can be routers or network edge devices. Interconnect gateways 550 can connect SDWAN fabric 510 to SDCI networks 540. Connectivity gateways 570 can connect SDCI networks 540 to cloud service providers 560-1 and 560-2 (collectively "cloud service providers 560" hereinafter).

In some examples, SDCI networks 540 can be software-defined cloud infrastructure networks. In some cases, SDCI networks 540 can be similar to networks 204A and 204B as illustrated in FIG. 2. SDCI networks 540 can act as intermediary networks between SDWAN fabric 510 and cloud service providers 560.

Cloud service providers 560 can include networks similar to networks 204A and 204B as illustrated in FIG. 2. Cloud service providers 560 can contain gateways 580-1 and 580-2 (collectively "gateways 580" hereinafter) and virtual cloud resources 590-1 and 590-2 (collectively "virtual cloud resources 590" hereinafter). Cloud service providers 560 can also be accessed by routers 595-1 and 595-2 (collectively "routers 595" hereinafter).

In some examples, the virtual cloud resources 590 can include virtual private networks hosted by a cloud network(s) and/or infrastructure associated with the cloud service providers 560. For example, in some cases, cloud service providers 560 can be Amazon Web Services (AWS), virtual cloud resources 590 can be virtual private clouds, and connectivity gateways 570 can be direct connect gateways. In another example, cloud service providers 560 can be Google Cloud, virtual cloud resources 590 can be virtual private clouds, and connectivity gateways 570 can be Google cloud routers.

Figure 5A:
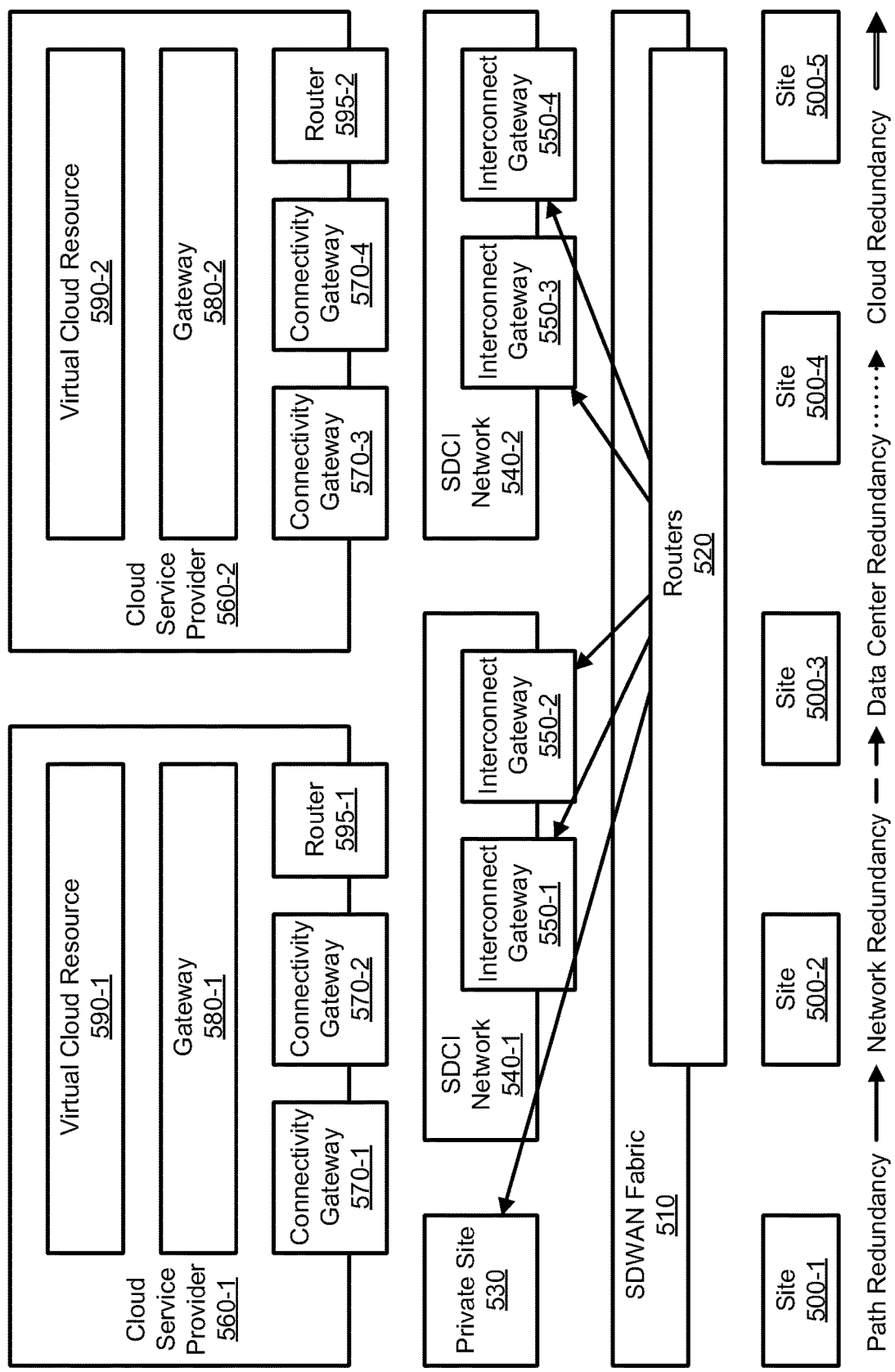

As shown in FIG. 5A, path redundancy can be achieved by configuring connectivity between routers 520 and multiple interconnect gateways 550. In some examples, path redundancy can be established using private site 530. Path redundancy allows redundant paths to access workloads and/or resources based on site preferences, path attributes (e.g., AS-PATH attributes), border gate protocol (BGP) multi exit discriminator (MED) configurations, prefixes, control plane data, service level agreements, service constraints, network conditions, and/or other factors.

Figure 5B:
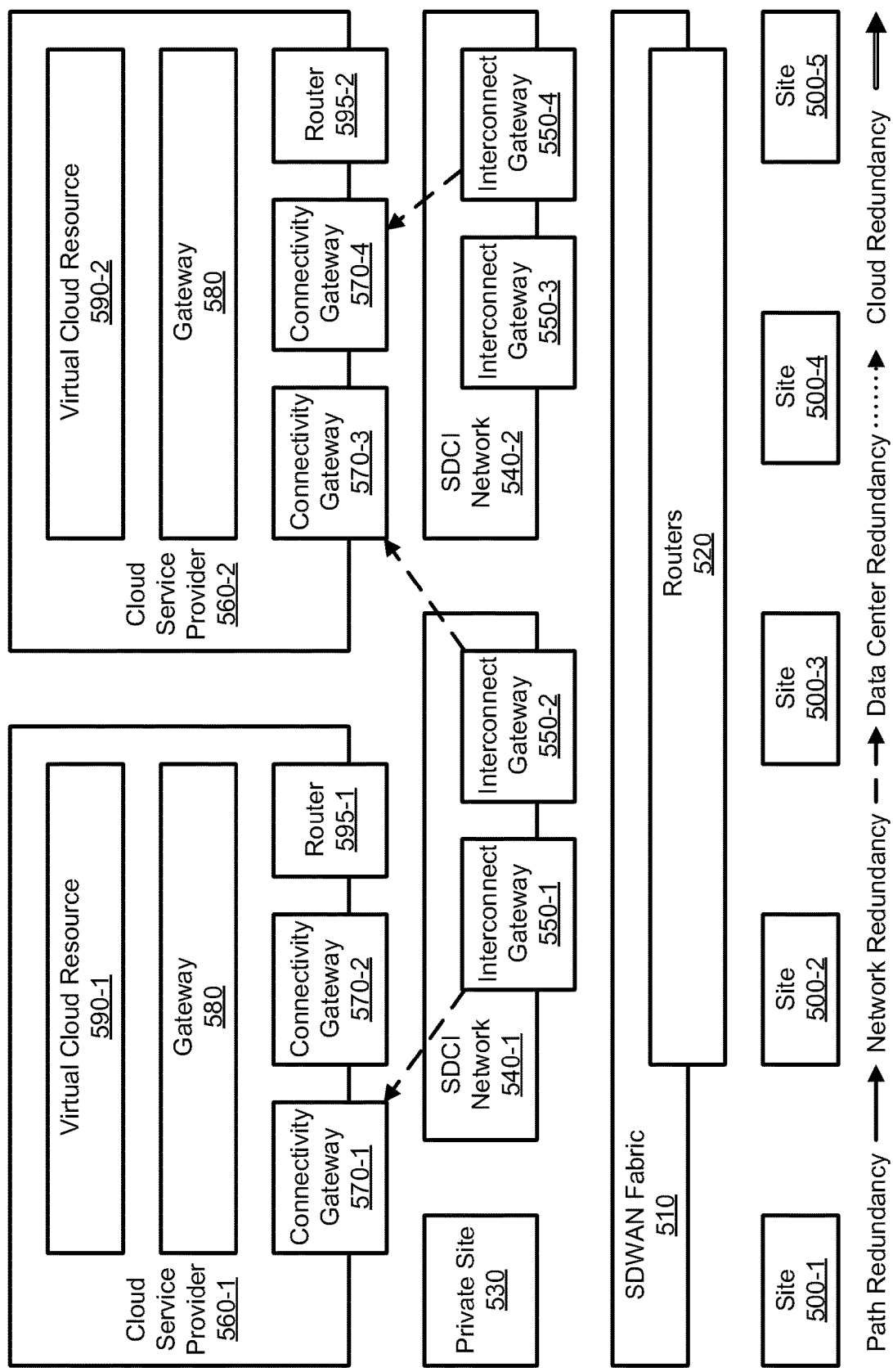

As shown in FIG. 5B, network redundancy can be achieved by configuring connectivity between a first interconnect gateway 550 in a first SDCI network 540 and a first connectivity gateway 570, and then configuring connectivity between a second interconnect gateway 550 in a second SDCI network 540 and a second connectivity gateway 570. Network redundancy allows redundant SDCI networks 540 to access workloads through interconnect gateways 550 in different SDCI networks 540.

As shown in FIG. 5C, data center redundancy can be achieved by configuring connectivity between multiple interconnect gateways 550 and connectivity gateway 570. Data center redundancy allows redundant sites 500 to access workloads through multiple interconnect gateways 550.

Figure 5D:
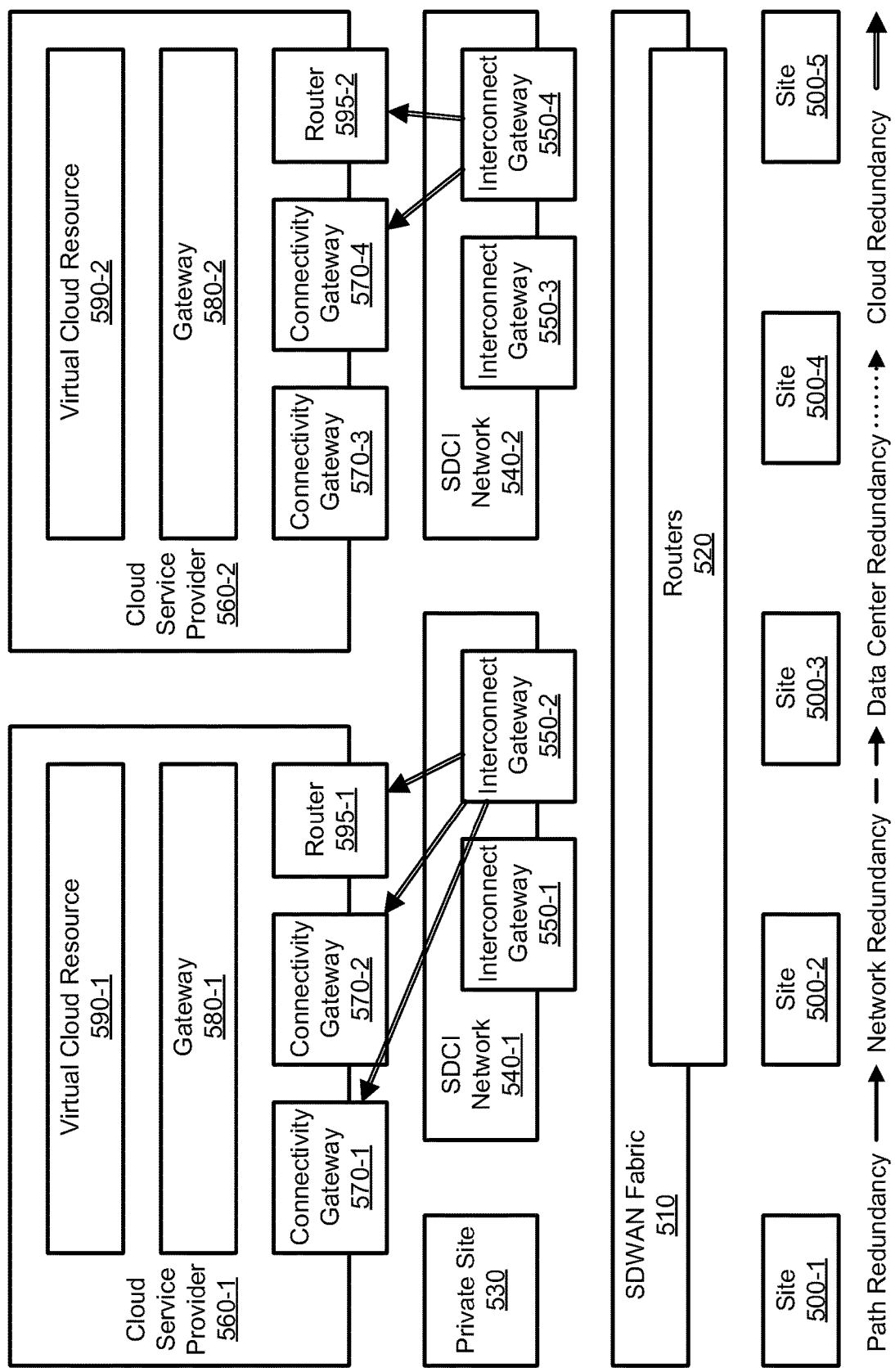

As shown in FIG. 5D, cloud redundancy can be achieved by configuring connectivity from interconnect gateway 550 to multiple connectivity gateways 570 or routers 595. Cloud redundancy allows redundant virtual cloud resources 590 to access workloads through multiple connectivity gateways 570.

All of these connections can be dynamically configured and managed from the point of view of sites 500 using an orchestrator, such as CISCO vManage. Resources in the traffic path, including routers 520, interconnect gateways 550, and connectivity gateways 570, can be provisioned and managed by the orchestrator. Network administrators can manage and scale the number of redundant paths to their workloads based on demand or other factors. Further details will be discussed in relation to FIGS. 6A-6C.

Collectively, this allows the orchestrator to manage path redundancy, network redundancy, data center redundancy, and cloud redundancy. Traffic paths can be determined based on prefix advertisement or BGP MEDS configured during the connection creation process. These connections can be end-to-end, configurable, scalable, and/or automated.

For example, the orchestrator can be used to bring up a redundant connection in an automated manner. To illustrate, the orchestrator can instantiate multiple interconnect gateways 550 at different physical locations within an SDCI network 540 and/or across multiple SDCI networks 540, thereby enabling data center redundancy. The orchestrator can bring up an SDWAN tunnel between routers 520 and the instantiated interconnect gateways 550 running in SDCI network(s) 540. Preferences for any one of sites 500 can be set for each interconnect gateway 550. The orchestrator can provide interconnect gateways 550 and SDCI network(s) 540 locations where the SDCI underlay hands off to a cloud service provider 560 for any virtual cloud resource (VCR) tags corresponding to virtual cloud resources 590 which are to be connected to a site 500.

The orchestrator can internally automate the configuration of an underlay by creating virtual Layer 2 (L2) connections from the chosen interconnect gateways 550 to the SDCI handoff locations. A virtual interface can be created in an account associated with cloud service provider 560 as part of this operation. The orchestrator can create connectivity gateways 570 in an account for cloud service provider 560 along with other gateways 580 to access virtual cloud resources 590. The orchestrator can automate the routing by creating and managing routing tables for virtual cloud resources 590. To achieve intra-cloud redundancy, the orchestrator can automate the creation of connections between multiple connectivity gateways 570 and a virtual cloud resource 590. The orchestrator can internally associate the virtual interfaces created in an account associated with cloud service provider 560 to the created connectivity gateways 570. The orchestrator can configure a BGP session between interconnect gateways 550 and connectivity gateways 570. The BGP MED can be configured to dynamically choose a preferred path. The orchestrator can validate that the redundant connections are created successfully.

At the end of this process, a network administrator or other agent operating at one of sites 500 can access virtual cloud resources 590 from site 500.

The orchestrator can also auto-scale connections to virtual cloud resources 590 within an SDCI network 540. To illustrate, the orchestrator can instantiate a new interconnect gateway 550 within a different physical location within an SDCI network 540. Given a set of existing connections to be replicated, the orchestrator can automate the connection replication from the new interconnect gateway 550 to virtual cloud resources 590. This replication process is similar to the process detailed above.

The orchestrator can automatically monitor the health and state of connections throughout the systems illustrated in FIGS. 5A-5D. If a link failure is noted, the orchestrator can attempt to reconcile the connection. It can also reconfigure a failed connection in response to a request.

Figure 6C:
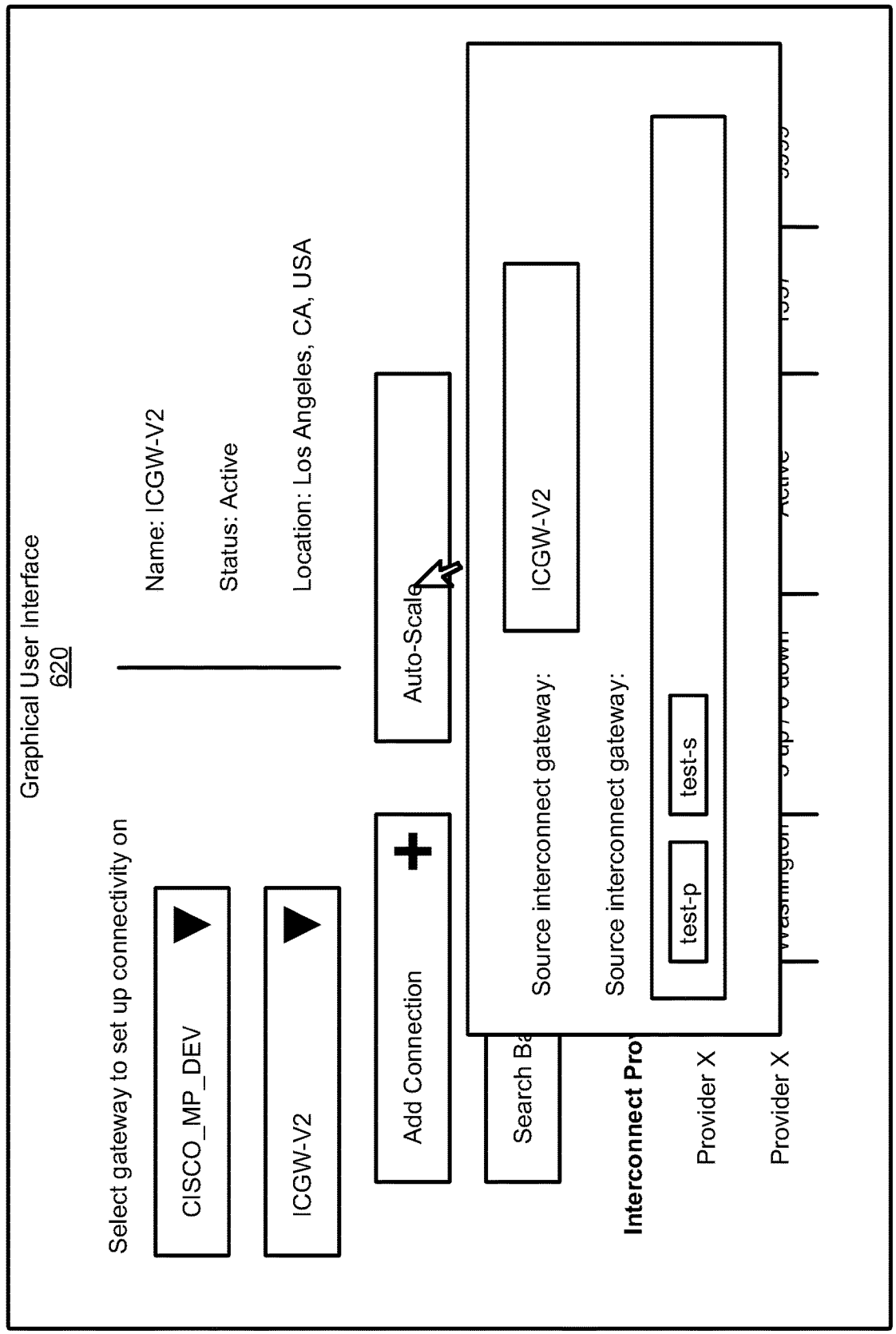

FIGS. 6A-6C illustrate example graphical user interfaces for the orchestrator discussed with respect to FIG. 5.

FIG. 6A illustrates an example graphical user interface (GUI) 600. In this example, GUI 600 can display the number of interconnect gateways, which can be similar to interconnect gateways 550 illustrated in FIGS. 5A-5D, and/or connections in the cloud infrastructure. GUI 600 can display a search bar for searching through the interconnect gateways. GUI 600 can display information about and/or associated with each interconnect gateway such as, for example and without limitation, information about an associated provider, region, connections, resource state, account ID, gateway ID, and/or any other relevant information.

FIG. 6B illustrates a graphical user interface (GUI) 610. In this example, GUI 610 can display the available interconnect gateways (e.g., in this example with drop-down menus when clicked). For a chosen interconnect gateway, such as ICFW-V2 in FIG. 6B, the GUI 610 can display status and location information. Clicking "add connection" can create a new connection.

FIG. 6C illustrates a graphical user interface (GUI) 620. When "auto-scale" is selected, the GUI 620 brings up an interface to choose an interconnect gateway and existing connections for auto-scaling. Chosen connections can automatically be cloned onto the selected interconnect gateway.

FIG. 7 illustrates an example method 700 for establishing a redundant path connection. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

At block 710, the method 700 includes configuring a software-defined wide-area network tunnel between an on-premises router and a plurality of SDWAN routers. For example, network orchestrator appliance 104 illustrated in FIG. 1 may configure a software-defined wide-area network tunnel between an on-premises router and a plurality of SDWAN routers.

In another example of the configuring a software-defined wide-area network tunnel at block 710, the method 700 can include instantiating the plurality of SDWAN routers across a plurality of physical locations, the plurality of physical locations provided by the at least one SDCI providers. For example, the network orchestrator appliance 104 illustrated in FIG. 1 may instantiate the plurality of SDWAN routers across a plurality of physical locations, the plurality of physical locations provided by the at least one SDCI providers.

At block 720, the method 700 includes configuring a virtual layer 2 connection between the plurality of SDWAN routers and handoff locations for at least one virtual cloud resource (VCR) associated with at least one VCR tag. In some examples, a software-defined cloud infrastructure (SDC) underlay associated with at least one SDCI provider connects to a cloud service provider (CSP) at the handoff locations. For example, network orchestrator appliance 104 illustrated in FIG. 1 may configure a virtual layer 2 connection between the plurality of SDWAN routers and handoff locations for at least one VCR associated with at least one VCR tag. A VCR tag can logically group workloads and/or routing domains (e.g., virtual networks, prefixes, tenant spaces, etc.) having a common characteristic(s) such as, for example, a common security group, a common network, a common routing domain, a common applicable policy, a common entity, a common function, a common tenant, a common type of traffic, a common type of workload, a common application/service, etc. In some examples, the VCR tag can logically group IaaS workloads with a name as defined by a network administrator protocol or other protocol.

In another example of configuring a virtual layer at block 720, the method 700 can include providing, to the plurality of SDWAN routers and the at least one SDCI providers, the handoff locations for at least one VCR tag. For example, network orchestrator appliance 104 illustrated in FIG. 1 may provide, to the plurality of SDWAN routers and the at least one SDCI providers, the handoff locations for at least one VCR tag.

At block 730, the method 700 includes configuring a VCR connection between at least one VCR associated with the at least one VCR tag and the handoff locations for the at least one VCR. For example, network orchestrator appliance 104 illustrated in FIG. 1 may configure a VCR connection between at least one VCR associated with the at least one VCR tag and the handoff locations for the at least one VCR tag.

At block 740, the method 700 includes configuring a border gateway protocol (BGP) session between the plurality of SDWAN routers and the at least one handoff locations. For example, network orchestrator appliance 104 illustrated in FIG. 1 may configure a BGP session between the plurality of SDWAN routers and the at least one handoff locations.

At block 750, the method 700 includes validating the SDWAN tunnel, the virtual layer 2 connection, the VCR connection, and the BGP session. For example, the network orchestrator appliance 104 illustrated in FIG. 1 may validate the SDWAN tunnel, the virtual layer 2 connection, the VCR connection, and the BGP session.

Figure 8:
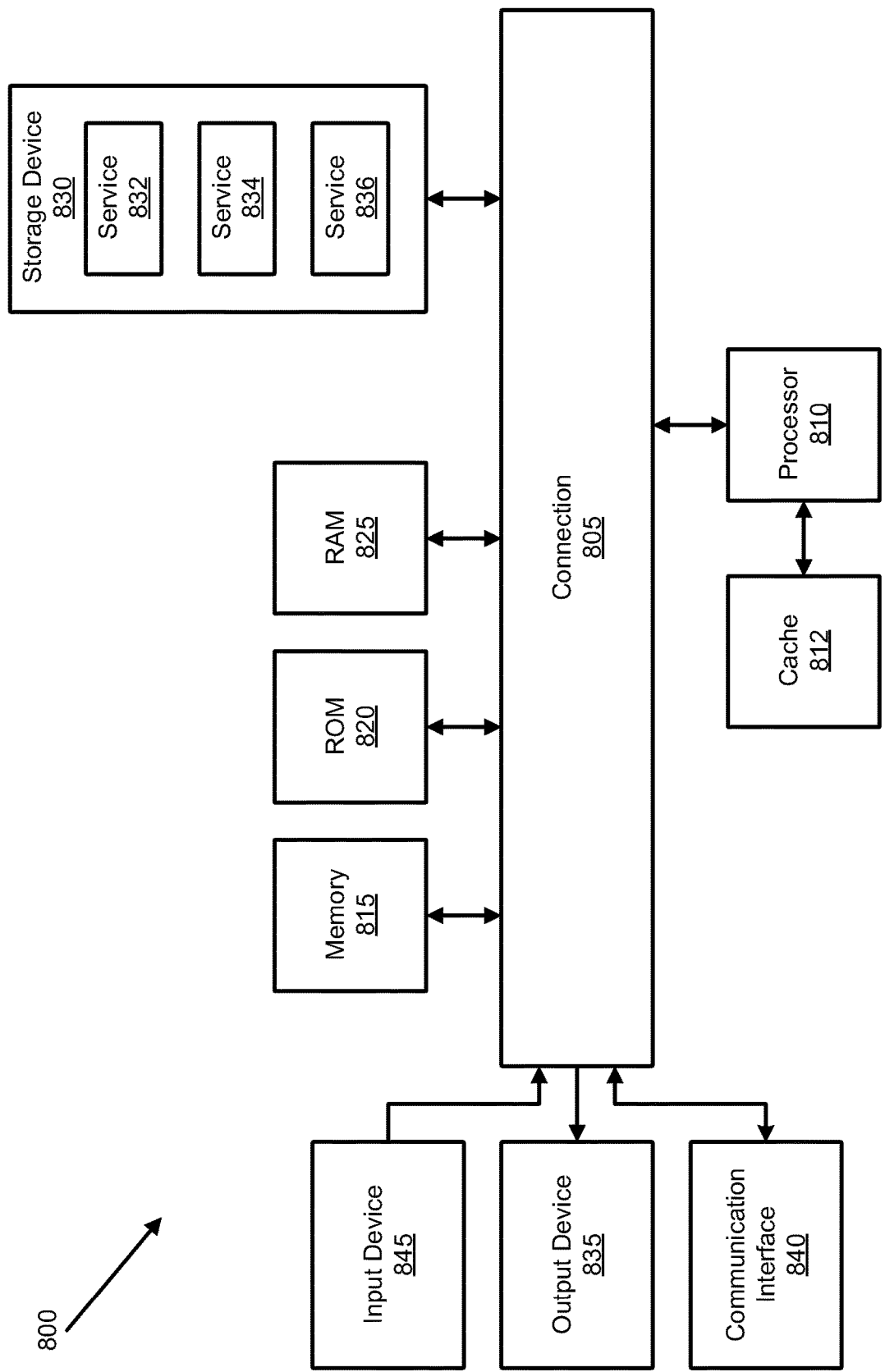
FIG. 8 shows an example of a system for implementing certain aspects of the present technology.

FIG. 8 shows an example of computing system 800, which can be for example any computing device making up network orchestrator appliance or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1: A method for configuring a redundant path connection, the method comprising: configuring a software-defined wide-area network (SDWAN) tunnel between an on-premises router and a plurality of SDWAN routers; configuring a virtual layer 2 connection between the plurality of SDWAN routers and connectivity gateways for at least one virtual cloud resource (VCR) tag, wherein a software-defined cloud infrastructure (SDCI) underlay associated with at least one SDCI provider connects to a cloud service provider (CSP) at the connectivity gateways; configuring a VCR connection between at least one VCR associated with the at least one VCR tags and the connectivity gateways for the at least one VCR tags; configuring a border gateway protocol (BGP) session between the plurality of SDWAN routers and the at least one connectivity gateways; and validating the SDWAN tunnel, the virtual layer 2 connection, the VCR connection, and the BGP session.

Aspect 2: The method of Aspect 1, wherein configuring the SDWAN tunnel between the on-premises router and the plurality of SDWAN routers comprises: instantiating the plurality of SDWAN routers across a plurality of physical locations, the plurality of physical locations provided by the at least one SDCI providers.

Aspect 3: The method of any of Aspects 1 to 2, wherein configuring the virtual layer 2 connection between the plurality of SDWAN routers and the connectivity gateways comprises: providing, to the plurality of SDWAN routers and the at least one SDCI providers, the connectivity gateways for at least one VCR tag.

Aspect 4: The method of any of Aspects 1 to 3, further comprising: generating virtual interfaces in CSP accounts associated with a user; and associating the virtual interfaces with the at least one connectivity gateways.

Aspect 5: The method of any of Aspects 1 to 4, further comprising: scaling at least one of network, data center, and cloud redundancy, including: receiving a scaling request, the scaling request including at least one of an SDCI account, an SDWAN router from the plurality of SDWAN routers, primary and secondary connectivity gateways, workload tags, and a virtual private network (VPN) segment; validating the scaling request; provisioning layer 2 virtual cross connects (VXCs) from the SDWAN router to the primary and secondary connectivity gateways, route propagation for workloads associated with the workload tags, BGP peering, and a site preference; configuring the SDWAN router; and validating the at least one of network, data center, and cloud redundancy.

Aspect 6: The method of any of Aspects 1 to 5, further comprising: scaling a redundancy within the at least one SDCI providers, including: selecting an SDCI account, an SDWAN router from the plurality of SDWAN routers, and a set of connections for scaling; retrieving information about the set of connections for scaling; provisioning layer 2 virtual cross connects (VXCs) from the SDWAN router to a connectivity gateway, route propagation for workloads, BGP peering, and a site preference; configuring the SDWAN router; and validating the redundancy.

Aspect 7: The method of any of Aspects 1 to 6, further comprising: detecting a connection failure in one of the SDWAN tunnel, the virtual layer 2 connection, the VCR connection, or the BGP session; attempting to reconcile the connection failure; notifying a user device of the connection failure; and reconfiguring a connection associated with the connection failure in response to a request from the user device.

What is claimed is:

1. A method for establishing a redundant path connection, the method comprising:
configuring a software-defined wide-area network (SDWAN) tunnel between an on-premises router and a plurality of SDWAN routers;
configuring a virtual layer 2 connection between the plurality of SDWAN routers and handoff locations for at least one virtual cloud resource (VCR) associated with at least one VCR tag, wherein a software-defined cloud infrastructure (SDCI) underlay associated with at least one SDCI provider connects to a cloud service provider (CSP) at the handoff locations;

configuring a VCR connection between at least one VCR associated with the at least one VCR tag and the handoff locations for the at least one VCR;

configuring a border gateway protocol (BGP) session between the plurality of SDWAN routers and the handoff locations to dynamically choose a preferred packet path within the redundant path connection;

validating the redundant path connection by validating the SDWAN tunnel, the virtual layer 2 connection, the VCR connection, and the BGP session; and dynamically tearing down connection to the on-premises router and switch to connection to the CSP based on validating the redundant path connection.

2. The method of claim 1, wherein configuring the SDWAN tunnel between the on-premises router and the plurality of SDWAN routers comprises:

instantiating the plurality of SDWAN routers across a plurality of physical locations, the plurality of physical locations provided by the at least one SDCI providers.

3. The method of claim 1, wherein configuring the virtual layer 2 connection between the plurality of SDWAN routers and the handoff locations comprises:

providing, to the plurality of SDWAN routers and the at least one SDCI providers, the handoff locations for the at least one VCR tag.

4. The method of claim 1, further comprising:

generating virtual interfaces in CSP accounts associated with a user; and associating the virtual interfaces with the handoff locations.

5. The method of claim 1, further comprising:

receiving a scaling request, the scaling request including at least one of an SDCI account, an SDWAN router from the plurality of SDWAN routers, primary and secondary handoff locations, workload tags, and a virtual private network (VPN) segment;

validating the scaling request;

provisioning layer 2 virtual cross connects (VXCs) from the SDWAN router to the primary and secondary handoff locations, route propagation for workloads associated with the workload tags, BGP peering, and a site preference;

configuring the SDWAN router; and validating at least one of network, data center, and cloud redundancy.

6. The method of claim 1, further comprising:

selecting an SDCI account, an SDWAN router from the plurality of SDWAN routers, and a set of connections for scaling;

retrieving information about the set of connections for scaling;

provisioning layer 2 virtual cross connects (VXCs) from the SDWAN router to a handoff location, route propagation for workloads, BGP peering, and a site preference;

configuring the SDWAN router; and validating the redundancy.

7. The method of claim 1, further comprising:

detecting a connection failure in one of the SDWAN tunnel, the virtual layer 2 connection, the VCR connection, or the BGP session;

attempting to reconcile the connection failure;

notifying a user device of the connection failure; and reconfiguring a connection associated with the connection failure in response to a request from the user device.

8. A system for establishing a redundant path connection, the system comprising:

one or more processors; and at least one computer-readable storage medium storing instructions which, when executed by the one or more processors, cause the one or more processors to:

configure a software-defined wide-area network (SDWAN) tunnel between an on-premises router and a plurality of SDWAN routers;

configure a virtual layer 2 connection between the plurality of SDWAN routers and handoff locations for at least one virtual cloud resource (VCR) associated with at least one VCR tag, wherein a software-defined cloud infrastructure (SDCI) underlay associated with at least one SDCI provider connects to a cloud service provider (CSP) at the handoff locations;

configure a VCR connection between at least one VCR associated with the at least one VCR tag and the handoff locations for the at least one VCR;

configure a border gateway protocol (BGP) session between the plurality of SDWAN routers and the handoff locations to dynamically choose a preferred packet path within the redundant path connection;

validate the redundant path connection by validating the SDWAN tunnel, the virtual layer 2 connection, the VCR connection, and the BGP session; and dynamically tear down connection to the on-premises router and switch to connection to the CSP based on validating the redundant path connection.

9. The system of claim 8, wherein the instructions for configuring the SDWAN tunnel between the on-premises router and the plurality of SDWAN routers cause the one or more processors to:

instantiate the plurality of SDWAN routers across a plurality of physical locations, the plurality of physical locations provided by the at least one SDCI providers.

10. The system of claim 8, wherein the instructions for configuring the virtual layer 2 connection between the plurality of SDWAN routers and the handoff locations cause the one or more processors to:

provide, to the plurality of SDWAN routers and the at least one SDCI providers, the handoff locations for the at least one VCR tag.

11. The system of claim 8, wherein the instructions are further effective to cause the one or more processors to:

generate virtual interfaces in CSP accounts associated with a user; and associate the virtual interfaces with the handoff locations.

12. The system of claim 8, wherein the instructions are further effective to cause the one or more processors to:

receive a scaling request, the scaling request including at least one of an SDCI account, an SDWAN router from the plurality of SDWAN routers, primary and secondary handoff locations, workload tags, and a virtual private network (VPN) segment;

validate the scaling request;

provision layer 2 virtual cross connects (VXCs) from the SDWAN router to the primary and secondary handoff locations, route propagation for workloads associated with the workload tags, BGP peering, and a site preference;

configure the SDWAN router; and validate at least one of network, data center, and cloud redundancy.

13. The system of claim 8, wherein the instructions are further effective to cause the one or more processors to:

select an SDCI account, an SDWAN router from the plurality of SDWAN routers, and a set of connections for scaling;

retrieve information about the set of connections for scaling;

provision layer 2 virtual cross connects (VXCs) from the SDWAN router to a handoff location, route propagation for workloads, BGP peering, and a site preference;

configure the SDWAN router; and validate the redundancy.

14. The system of claim 8, wherein the instructions are further effective to cause the one or more processors to:

detect a connection failure in one of the SDWAN tunnel, the virtual layer 2 connection, the VCR connection, or the BGP session;

attempt to reconcile the connection failure;

notify a user device of the connection failure; and reconfigure a connection associated with the connection failure in response to a request from the user device.

15. A non-transitory computer-readable storage medium for establishing a redundant path connection having stored therein instructions which, when executed by a processor, cause the processor to:

configure a software-defined wide-area network (SD-WAN) tunnel between an on-premises router and a plurality of SDWAN routers;

configure a virtual layer 2 connection between the plurality of SDWAN routers and handoff locations for at least one virtual cloud resource (VCR) associated with at least one VCR tag, wherein a software-defined cloud infrastructure (SDCI) underlay associated with at least one SDCI provider connects to a cloud service provider (CSP) at the handoff locations;

configure a VCR connection between at least one VCR associated with the at least one VCR tag and the handoff locations for the at least one VCR;

configure a border gateway protocol (BGP) session between the plurality of SDWAN routers and the handoff locations to dynamically choose a preferred packet path within the redundant path connection;

validate the redundant path connection by validating the SDWAN tunnel, the virtual layer 2 connection, the VCR connection, and the BGP session; and dynamically tear down connection to the on-premises router and switch to connection to the CSP based on validating the redundant path connection.

16. The non-transitory computer-readable storage medium of claim 15, wherein the instructions for configuring the SDWAN tunnel between the on-premises router and the plurality of SDWAN routers cause the processor to:

instantiate the plurality of SDWAN routers across a plurality of physical locations, the plurality of physical locations provided by the at least one SDCI providers.

17. The non-transitory computer-readable storage medium of claim 15, wherein the instructions for configuring the virtual layer 2 connection between the plurality of SDWAN routers and the handoff locations cause the processor to:

provide, to the plurality of SDWAN routers and the at least one SDCI providers, the handoff locations for the at least one VCR tag.

18. The non-transitory computer-readable storage medium of claim 15, wherein the instructions are further effective to cause the processor to:

generate virtual interfaces in CSP accounts associated with a user; and associate the virtual interfaces with the handoff locations.

19. The non-transitory computer-readable storage medium of claim 15, wherein the instructions are further effective to cause the processor to:

receive a scaling request, the scaling request including at least one of an SDCI account, an SDWAN router from the plurality of SDWAN routers, primary and secondary handoff locations, workload tags, and a virtual private network (VPN) segment;

validate the scaling request;

provision layer 2 virtual cross connects (VXCs) from the SDWAN router to the primary and secondary handoff locations, route propagation for workloads associated with the workload tags, BGP peering, and a site preference;

configure the SDWAN router; and validate at least one of network, data center, and cloud redundancy.

20. The non-transitory computer-readable storage medium of claim 15, wherein the instructions are further effective to cause the processor to:

select an SDCI account, an SDWAN router from the plurality of SDWAN routers, and a set of connections for scaling;

retrieve information about the set of connections for scaling;

provision layer 2 virtual cross connects (VXCs) from the SDWAN router to a handoff location, route propagation for workloads, BGP peering, and a site preference;

configure the SDWAN router; and validate the redundancy.

* * * * *